United States Patent [19]

Butler

[11] Patent Number: 4,464,322

[45] Date of Patent: Aug. 7, 1984

[54] METHOD OF MAKING A SEAL

[75] Inventor: John D. Butler, Van Wert, Ohio

[73] Assignee: Federal-Mogul Corp., Detroit, Mich.

[21] Appl. No.: 455,782

[22] Filed: Jan. 5, 1983

[51] Int. Cl.³ .................. B29C 17/10; B29D 3/00; B29G 1/00

[52] U.S. Cl. .................. 264/138; 29/460; 29/527.1; 264/161; 264/250; 264/262; 264/267; 264/271.1; 264/320; 264/138

[58] Field of Search .......... 264/262, 261, 263, 271.1, 264/127, 161, 279, 320, 250, 267–269, 259, 161, 138, 320; 277/1, 152, 153, 134, 223, 227, 228, 233; 156/245, 295; 29/460, 527.1, 527.2, 527.4

[56] References Cited

U.S. PATENT DOCUMENTS

| | | |
|---|---|---|
| 2,736,585 | 2/1956 | Riesing .................. 227/153 |
| 3,495,843 | 2/1970 | Anderson et al. ............ 277/153 |
| 3,837,660 | 9/1974 | Poggio .................. 277/153 |
| 3,875,654 | 4/1975 | Ushijima .................. 29/527.1 |
| 4,006,210 | 2/1977 | Denton .................. 264/259 |
| 4,166,627 | 9/1979 | Bainard et al. ............ 277/227 |
| 4,171,561 | 10/1979 | Bainard et al. ............ 264/268 |
| 4,239,243 | 12/1980 | Bainard et al. ............ 277/223 |
| 4,406,847 | 9/1983 | O'Neal et al. ............ 264/262 |

Primary Examiner—Willard E. Hoag

[57] ABSTRACT

A method of making a seal of the type which includes a rigid case, a first seal portion of an elastomeric material and a second seal portion of a low friction material. The method includes placing the rigid case, a wafer of low friction material and two elastomeric blanks into a mold, closing the mold to maintain the aforementioned case, blanks and wafer in position and thereafter further closing the mold to form the seal.

14 Claims, 4 Drawing Figures

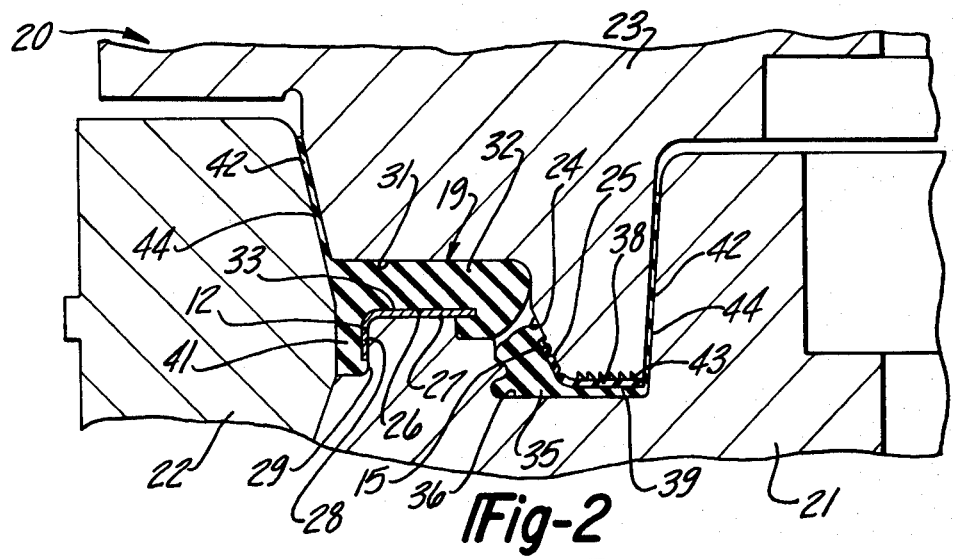
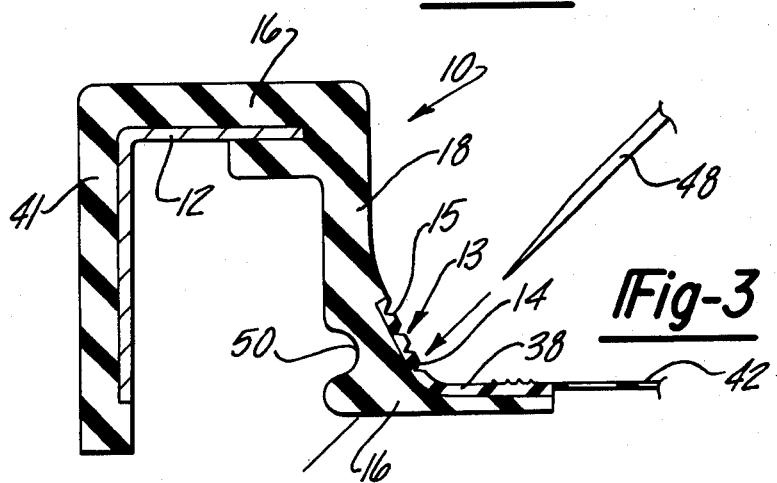
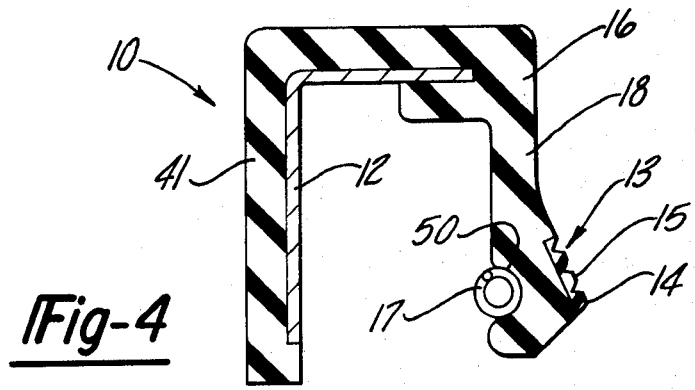

METHOD OF MAKING A SEAL

BACKGROUND OF THE INVENTION

1. Technical Field

The present invention relates to a method of making seals including a sealing lip of low friction material which is adapted to engage a relatively moveable part. More specifically, the invention relates to a method of molding an oil seal wherein a wafer of low friction material and a seal case are clamped against a portion of a mold by rings of elastomeric material while the elastomeric material is molded to form the body of the oil, or shaft, seal.

2. Prior Art

Oil seals are used in many different types of machinery to seal lubricated areas of relatively moveable parts. A high quality oil seal should exert a minimum of friction between moveable parts and must be capable of forming a tight seal even after extended periods of use. Polytetrafluoroethylene (PFTE) or other low friction material is sometimes used at the sealing lip of a seal for long wear and its low friction characteristics. However, since PTFE is a stiff material it is often desireable to use it in combination with an elastomeric backing material which is flexible enough to compensate for some misalignment of the seal or shaft runout.

A shaft seal is a frequently used type of oil seal which is installed in a bore to seal against a rotating shaft. Shaft seals having a sealing lip of low friction material secured to a rigid case by means of an elastomeric material are precision parts manufactured to close tolerances. The sealing lip and rigid case must be accurately located to assure satisfactory seal performance.

Holding a wafer of low friction material in a mold as it is formed during the molding operation has always been a problem in the manufacture of such a seal. Similarly, establishing the location of the rigid case within the mold can be difficult when the outer diameter of the case is to be covered with elastomeric material during the same molding process.

Various methods of molding shaft seals having a lip made of low friction material are known in the prior art. However, prior art methods frequently fail to locate the wafer of low friction material precisely relative to the case, especially when the seal case includes an elastomeric outer diameter.

One such prior art method is disclosed in U.S. Pat. No. 4,171,561 to Bainard wherein a wafer of low friction material is secured to a rigid metal case by a molded elastomeric material. In the Bainard seal, the metal case is not positively located during the molding operation. Consequently, the metal case may be lifted by the elastomeric material during the molding operation thereby preventing the metal case from being precisely located relative to the sealing lip in the finished product.

Another prior art method of molding a shaft seal having a low friction lip is disclosed in U.S. Pat. No. 4,159,298 to Bainard in which a transfer mold is used to make a seal having an annular metal case and a polytetrafluoroethylene (PTFE) sealing element bonded together with elastomeric material. The metal case is held in place during the molding operation by a plurality of support pins that may become worn or distorted in time, resulting in the expense of frequent inspection and replacement. The pins also create bare spots on the metal case which may be objectionable under certain circumstances. In addition, the annular PTFE wafer is not held in place during the molding operation, making it subject to migration during molding.

A prior art method of molding a seal having an elastomer coating on the outer diameter is disclosed in U.S. Pat. No. 4,006,210 to Denton. However, the Denton molding apparatus and process yields a seal in which the location of the seal lip and case are subject to substantial variation in location relative to one another. In the Denton seal design the PTFE wafer is held directly against the metal case without intermediate elastomer for providing adequate flexibility to compensate for shaft run out or variation in the location of the seal lip relative to the metal case.

In summary, none of the methods shown in the above patents positively preclude migration or mislocation of the metal case or PTFE wafer. It is to this end that the present invention is directed.

SUMMARY OF THE INVENTION

The present invention relates to a method of molding a seal in which two separate elastomeric prep rings are used to form the body of the seal interconnecting the seal case with the wafer of low friction material. During the molding operation, one prep ring of elastomeric material flows across one side of the wafer as the other prep ring flows across one side of the case to encase it in elastomeric material. The prep rings flow together in the flex section of the seal to form a unitary elastomeric body for the seal.

During the molding operation, the first prep ring is held against the metal case between the upper and lower portions of the mold. Similarly, the second prep ring and wafer of low friction material are held together by the upper and lower portions of the mold during the molding operation. The portion of the mold engaging the wafer of low friction material preferably has concentric ridges or other gripping means for holding the wafer in place during the molding operation.

The wafer and elastomeric material are trimmed subsequent to the molding operation to create a precisely located and well defined seal lip. The seal lip is cut by rotating the seal on a spindle and cutting the low friction material and elastomeric material from the wafer side with a knife to form a clean edge on the seal.

It is therefore an object of the present invention to provide a method of molding an oil seal having a wafer of low friction material and a rigid case which are held against part of the mold by first and second rings of elastomeric material throughout the molding operation. The method of the present invention consistently produces a seal of high quality with the wafer of low friction material and rigid case being precisely located relative to one another throughout the molding operation and in the final oil seal. The seal may also be provided with a molded elastomeric outer diameter without any loss in accuracy.

Another object of the present invention is to eliminate the need for support pins in the mold to hold the rigid case and the wafer of low friction material during the molding operation. This feature reduces the cost of the mold and also reduces the complexity of the mold.

These and other advantages will be better understood after studying the following detailed description and claims in view of the drawings.

BRIEF DESCRIPTION OF THE DRAWINGS

FIG. 2 is a partial cross-sectional view of a mold during the molding operation showing the flow of the elastomeric material.

FIG. 3 is a partial cross-sectional view of a molded seal prior to the final trimming operation.

FIG. 4 is a partial cross-sectional view of one type of seal made in accordance with the present invention.

DETAILED DESCRIPTION OF THE PREFERRED EMBODIMENT

Figure 1:
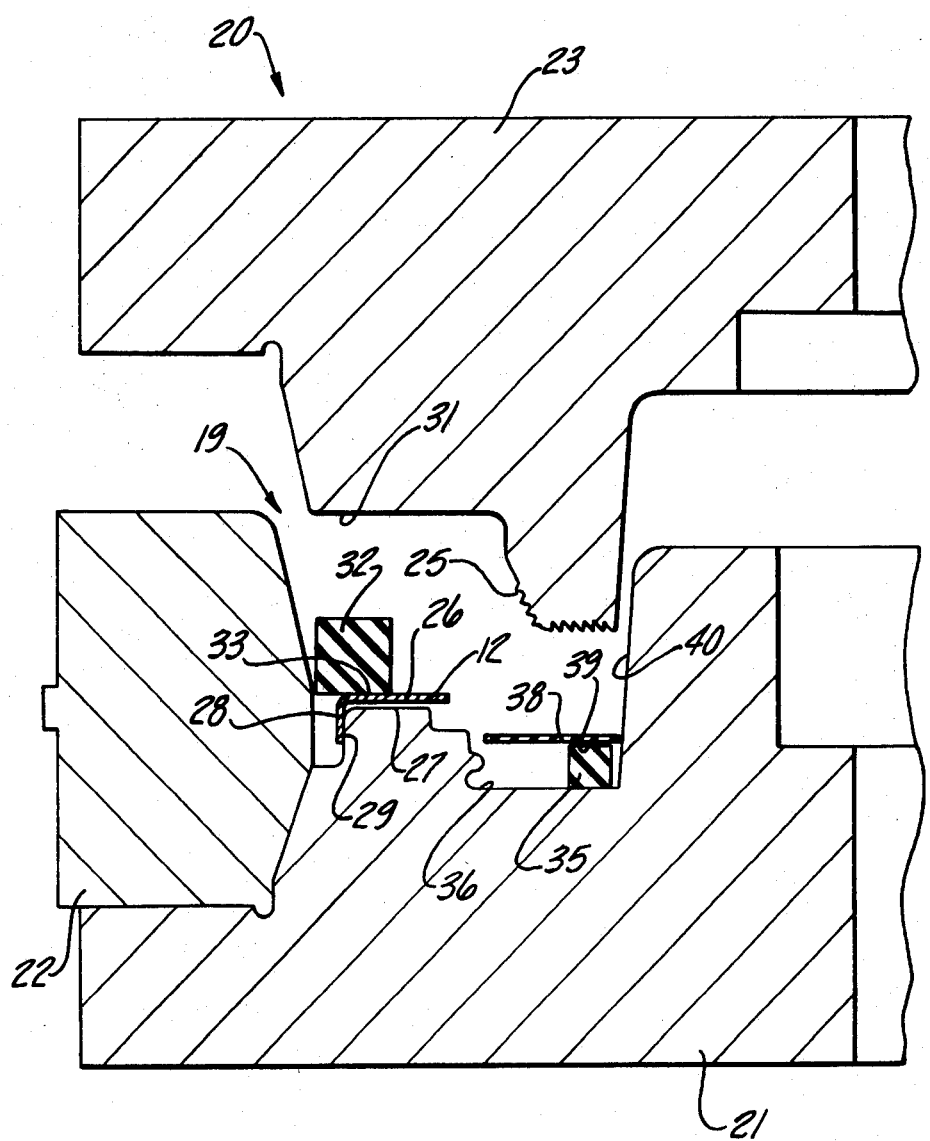
FIG. 1 is a partial cross-sectional view through a mold used in manufacturing a shaft seal showing the location of the component parts of the seal prior to molding in accordance with the invention.

Referring now to the drawings, one form of the seal 10 is shown in FIG. 4. The seal 10 includes a case 12 which is a cup shaped annular member preferably press formed from steel. The seal 10 has a lip portion 13 of low friction material having a sealing lip 14 which is adapted to engage a shaft. Hydrodynamic pumping elements 15 may be provided on the lip portion 13 to improve the seal performance. The low friction material is preferably a wafer of sintered polytetrafluoroethylene (PTFE). The seal 10 includes an elastomeric body 16 which is molded to and interconnects the case 12 and lip portion 13. An annular coil spring 17 is shown in the disclosed embodiment disposed within an annular molded groove 50 within the elastomeric body 16 for holding the lip 14 in engagement with the shaft. The portion of the elastomeric body interconnecting the case 12 and lip portion 13 is commonly referred to as a flex section 18.

In the disclosed embodiment the seal 10 is a shaft seal having an internal sealing lip 14 adapted to engage a shaft. However, it should be realized that the method may be applied to other types of seals, such as bore seals having an external sealing lip adapted to contact the internal diameter of a bore.

The apparatus used in practicing the present invention, as shown in FIGS. 1 and 2, comprises a mold cavity, generally indicated by the reference numeral 19, formed in a mold, generally indicated by the reference numeral 20. The mold 20 comprises a lower die 21 defining the lower surface of the mold cavity 19, an insert 22 defining the outer perimeter of the mold cavity 19, and an upper die 23 defining the upper portion of the mold cavity 19. The upper die 23 in the disclosed embodiment is moveable relative to the lower die 21 and insert 22 to permit the mold 20 to be opened and closed. If a hydrodynamic pumping element 15 is called for on a seal, the lower most frustoconical portion 24 of the upper die 23 which forms the lip portion 13 during molding may include one or more molding elements 25 for forming the hydrodynamic pumping element 15.

In the embodiment shown in the drawings the hydrodynamic pumping element 15 is a helical groove or ridge. As a shaft rotates relative to the seal 10, any oil located between the shaft and the seal would be moved away from the sealing lip 14 by the hydrodynamic pumping element 15. As an alternative, a plurality of flutes or vanes may be formed near the lip 14 to accomplish the same function as is well known in the art.

Referring now to FIG. 1, loading the seal components into the mold 20 will be explained in detail. The following steps may be performed in any one of several sequences or may be performed simultaneously, depending on the skill or preference of the mold machine operator. The case 12 is loaded into an upper portion 31 of the mold cavity 19 so that the radial flange 26 rests upon the top surface 27 of the lower die 21. The cylindrical flange 28 of the case 12 is sized such that flange 28 closely abuts the surface 29 of the lower die 21 about its circumference.

The first prep ring 32 is then laid upon the upper side of the radial flange 26 in the upper portion 31 of the mold cavity 19. The first prep ring 32 is preferably an annular member formed of uncured elastomeric material.

The second prep ring 35 which is an annular ring of uncured elastomeric material of the same or compatible material as that of the first prep ring is placed in the lower portion 36 of the mold cavity 19.

A ring shaped wafer 38 of PTFE is then placed on top of the second prep ring so that its lower side 39 contacts the second prep ring 35.

It should be understood when studying the drawings that the elements of the seal 10 and mold 20 are annular members which are shown in partial cross-section. The cylindrical flange 28 of the case 12 is therefore initially located on the cylindrical surface 29 of the lower die 21. The wafer 38 is located in the lower portion of the cavity 19 and is centered on the frustoconical surface 40 of the lower die 21 at a height determined by the thickness of the second prep ring 35. The case 12 and wafer 38 are thereby precisely located by the die 20 prior to the molding operation.

Referring to FIG. 2, the molding step of the present invention will be described. After the case 12, wafer 38, and first and second prep rings 32, 35 have been loaded into the mold cavity 19, the mold 20 is ready for the molding step. The rubber molding die 20 is preferably preheated to a temperature sufficient to melt and cure the elastomeric material of the first and second prep rings 32 and 35. Initially, the upper die 23 is caused to move toward the lower die 21 and insert 22 to force the first prep ring 32 against the upper side 33 of the radial flange 26. Simultaneously, the upper die 23 is caused to press the wafer 38 against the second prep ring 35. As the upper die 23 continues its movement the first and second prep rings 32 and 35 are caused to flow and fill the remaining open portion of the cavity 19. The first prep ring 32 flows along the cylindrical flange 28 to form the outer diameter 41 of the finished seal 10 and along the upper side 33 of the radial flange 26 toward the second prep ring 35 and wafer 38. Simultaneously, the second prep ring 35 flows across the lower side 39 of the wafer 38 filling the lower portion 36 of the mold cavity 19 including a portion located between the case 12 and lip portion 13. In some dies excess elastomeric material may overflow to form a thin flash portion 42 between the upper die 23 and lower die 21 or insert 22 in the space identified by the numeral 44 which is subsequently trimmed off.

During the molding operation the wafer 38 is held by a plurality of concentric ridges 43 formed in the upper die 23. The concentric ridges 43 in the disclosed embodiment have a saw tooth configuration which partially deforms and securely grips the wafer 38. The wafer 38 is deformed by reason of the heat and pressure of the upper die 23 acting thereon.

It will be noted that during the molding operation the first prep ring 32 holds the case 12 firmly against top surface 27 of the lower die 21 to prevent elastomeric material from being forced between the case 12 and lower die 21. This prevents the elastomeric material from lifting the case 12 off of the top surface 27 by hydraulic pressure acting on the lower surface of the flange 26. In this regard, it is important that the portion of flange 26 supported by the top surface 27 is substantial and preferably greater than the unsupported portion of flange 26. This assures accurate location of the metal case 12 in the finished seal 10.

The second prep ring 35 holds the wafer 38 firmly against the upper die to prevent elastomeric material from flowing between the upper die 23 and the wafer 38 during the molding operation. As a result, the upper side of the wafer 38 remains free of elastomeric material. This is a desirable object of the present invention since elastomeric material on the lip 14 of the finished seal could reduce the efficiency of the seal by creating additional friction between the seal lip 14 and the shaft, and also by interfering with the sealing function of the lip 14.

As the second prep ring 35 flows against the wafer 38, the wafer 38 is forced into engagement with the frustoconical portion 24 of upper die 23. The frustoconical portion 24 may include one or more mold elements 25 comprising protrusions or cavities for forming one spiral groove or a plurality of flutes which act as hydrodynamic elements 15 on the finished lip portion 13 to improve the sealing capability of the seal 10.

The upper die 23 continues moving downwardly until the mold cavity 19 defines the desired shape of the finished seal 10. Upon upper die 23 reaching this final position, the mold cavity 19 remains closed until the seal is fully cured, following which the upper die 23 is opened and the seal may be removed from the die 20.

The seal is then placed on a rotatable spindle (not shown) and rotated as a knife 48, as shown in FIG. 3, cuts the wafer 38 and elastomeric body 16 at the lip portion 13 to form the lip 14. The lip 14 thus formed is smooth and substantially free of any irregularity. Since the knife enters from the wafer side of the seal 10 any ragged edges caused by entry of the knife 48 into the seal form on the elastomeric side of the seal 10.

An important feature of the present invention is the sizing of the first and second preps so that they flow together and merge in a non-critical area such as the flex section 18 as described. For example, if the first and second prep rings 32 and 35 were to flow together at the lip portion 13, part of the first prep ring 32 could possibly flow between the wafer 38 and the upper die 23. Likewise, if the second prep ring 35 was sized to merge with the first prep ring 32 adjacent the case 12, the second prep ring 35 could flow between the case 12 and the top surface 27 of the lower die 21.

The foregoing is a description of one embodiment of the present invention and should be read as being exemplary and is not to be construed in a limiting sense.

Having fully described an operative embodiment of the invention, I now claim:

1. A method for making a seal having a sealing lip portion lined with a low friction material and a body made of an elastomeric material comprising the steps of:
   placing a rigid annular case in a mold;
   placing a first ring of uncured elastomeric material in said mold on one side of said case;
   placing a second ring of uncured elastomeric material in the mold at a location radially spaced from said case, said second ring being disposed adjacent an axially opposite side of said case from said first elastomeric ring;
   placing an annular wafer of low friction material on one side of said second ring;
   closing and heating the mold to cause said first ring to bond to said one side of the case and flow both away from the annular wafer across said one side to fill a first portion of the mold and toward the second ring;
   bonding said wafer to the second ring as said second ring flows along the wafer toward the first ring filling a second portion of the mold;
   joining the first ring and the second ring at a location between said case and said wafer to form an integral body; and
   maintaining said mold at a temperature sufficient to substantially cure the first and second rings of uncured elastomeric material.

2. In the method of claim 1 wherein during said closing and heating step said first ring flows across and around peripheral portions of said case to form an elastomeric outer diameter on said seal case.

3. In the method of claim 1 wherein during said joining step said first ring and said second ring combine with one another at a non-critical location between said wafer and said case.

4. In the method of claim 1 further including the step of trimming the wafer and said second ring of elastomeric material about an inner radius to form a seal lip thereon.

5. In the method of claim 4 wherein the step of trimming the wafer comprises removing the integral body from the mold;
   rotating the integral body on a spindle;
   cutting a seal lip on the integral body while rotating by inserting a knife through the integral body.

6. In the method of claim 1 wherein said step of placing said first ring of uncured elastomeric material in said mold includes placing the first ring on top of the case, and said step of placing the annular wafer of low friction material in said mold includes placing said wafer on top of said second ring of uncured elastomeric material.

7. In the method of claim 6 wherein said closing and heating step includes the step of holding said case in place within the mold with said first ring of uncured elastomeric material.

8. In the method of claim 7 wherein said bonding step includes the step of holding the wafer in place within the mold with said second ring of elastomeric material.

9. In the method of claim 8 wherein the wafer is held in place solely by the second ring pressing the wafer against a series of concentric ridges formed in the mold.

10. In a method of making an oil seal in a mold comprising the steps of placing a rigid case in the mold, placing a wafer of low friction material in the mold and molding an elastomeric body to interconnect said case and form said wafer wherein the improvement comprises:
   placing a first elastomeric ring adjacent to said case in the mold;
   placing a second elastomeric ring adjacent to said wafer in the mold radially spaced from said case and adjacent an axially opposite side of said case from said first elastomeric ring;
   holding the case and the wafer of low friction material in said mold with the first and second elastomeric rings respectively;
   molding the elastomeric body from the first and second elastomeric rings.

11. In the method of claim 10 wherein the first and second rings of elastomeric material merge between the case and the wafer.

12. In the method of claim 10 wherein said first ring of elastomeric material is molded about the outer diameter of the case.

13. In the method of claim 10, the further step of trimming said wafer and said elastomeric body to form a lip on said oil seal.

14. In the method of claim 13 wherein said trimming step is effected by inserting a knife first through the wafer and then through the elastomeric body as said seal is rotated.

* * * * *